United States Patent [19]  [11] Patent Number: 4,548,966
Moore  [45] Date of Patent: Oct. 22, 1985

[54] ASPHALT EMULSION

[75] Inventor: Richard B. Moore, Chattanooga, Tenn.

[73] Assignee: Polysar Financial Services S.A., Canton of Fribourg, Switzerland

[21] Appl. No.: 638,790

[22] Filed: Aug. 8, 1984

[51] Int. Cl.⁴ .......................... C08L 3/14; C08L 9/04; C08L 9/10; C08L 95/00
[52] U.S. Cl. ................................. 524/53; 106/212; 524/52; 524/69; 524/71
[58] Field of Search .................... 106/212; 524/52, 53, 524/69, 71

[56] References Cited

U.S. PATENT DOCUMENTS 2,434,243  1/1948  Hjelte ................................. 106/212
4,018,730  4/1977  McDonald ........................... 524/60

FOREIGN PATENT DOCUMENTS 437674  11/1935  United Kingdom .

Primary Examiner—Allan M. Lieberman
Attorney, Agent, or Firm—Stevens, Davis, Miller & Mosher

[57] ABSTRACT

The viscosity of an asphalt emulsion may be controlled by incorporating up to about 1 percent by weight of a modified starch containing not more than 27 percent amylose and the balance substantially amylopectin.

19 Claims, No Drawings

ASPHALT EMULSION

FIELD OF THE INVENTION

The present invention relates to the modification of asphalt, specifically the modification of emulsions of asphalt to meet ASTM specifications for Saybolt viscosity of various grades of asphalt emulsions. As used in this specification, the term asphalt is intended to include both naturally occuring asphalts such as Trinidad Lake asphalt and synthetic asphalt produced from refining oil.

BACKGROUND OF THE INVENTION

Asphalt has been used as a construction material by man since at least as early as biblical times. The slime pits of Gomorrah, used in mortar in the construction of the tower of Babel were asphalt. In more recent times, asphalt has been used as a cement in the construction of pavement. Asphalt emulsions are widely used in the manufacture and maintenance of pavements. One problem encountered is that the hot or warm asphalt emulsion is too fluid and may separate from the aggregate. This is particularly true if the asphalt emulsion has been modified with a latex of a synthetic polymer. The modification of asphalt with synthetic polymers has been well known since at least the 1930's. There are a number of texts discussing the application and modification of asphalt including Asphalts and Allied Substances, Fifth Ed., by Herbert Abraham, Van Nostrand; Asphalt Science and Technology, Edwin J. Barth, Gordon and Breach; Asphalts and Road Materials, Modern Technology, John E. Parson, Noyes Data Corp., 1977; and A Basic Asphalt Emulsion Manual, The Asphalt Institute Manual Series No. 19 (MS-19), March 1979.

Applicant has been able to locate only one patent which discusses the use of various natural thickeners in asphalt emulsions.

British Pat. No. 437,674, published Nov. 4, 1935, in the name of E. I. Du Pont de Nemours and Company discloses a dispersing agent for aqueous emulsions of asphalt. The dispersing agent is an alkali (including ammonium) or alkaline earth salt of an alkyl sulphuric acid, the alkyl radical containing at least 8 carbon atoms. The disclosure also states "The emulsions may also contain thickening agents such as casein, albumen, glue, gelatin, resin, or starches, tannin, gums, dextrin and tapioca flour . . . ." Cationic rapid set emulsions typically have a pH of about 3. Conventional anionic emulsions have a pH of about 12. Generally, unmodified starches degrade in a relatively short time at pH's of less than about 5 or greater than about 10.

At the present time, there are no convenient post-additives which may be subsequently added to an existing asphalt emulsion to built and maintain its viscosity. Generally, if the viscosity of an asphalt emulsion is too low, it is necessary to blend the emulsion with an emulsion having a higher viscosity to try to raise the viscosity of the asphalt emulsion.

SUMMARY OF THE INVENTION

The present invention provides a method of adjusting the viscosity of an asphalt emulsion having a pH up to about 10 to at least about 75 Saybolt seconds at 122° F. which comprises adding to said emulsion up to about 1 percent by weight of a modified starch consisting of not more than about 27 percent amylose and the balance substantially amylopectin.

The present invention also provides a composition comprising a latex having a pH up to about 10 from the group:

(a) a homopolymer of a $C_4$–$C_6$ conjugated diolefin;
(b) a copolymer of
  (i) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
  (ii) from about 60 to about 80 weight percent of a $C_{4-6}$ conjugated diolefin;
  (iii) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; and
(c) a copolymer of
  (i) up to about 40 weight percent of a $C_{3-6}$ alkenyl nitrile; and
  (ii) the balance a $C_{4-6}$ conjugated diolefin;

and up to about 15 percent by dry weight based on the dry weight of the latex of a modified starch consisting of not more than 20 percent amylose and the balance substantially amylopectin.

The present invention further provides a modified aqueous asphalt emulsion having 50 to 75 percent by weight solids a pH of less than about 10 comprising on a dry basis:

(a) from about 84 to about 99.9 parts by weight of an asphalt;
(b) up to about 15 parts by weight of a polymer selected from the group:
(i) a homopolymer of a $C_4$–$C_6$ conjugated diolefin;
(ii) a copolymer of:
  (1) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
  (2) from about 60 to about 80 weight percent of a $C_{4-6}$ conjugated diolefin;
  (3) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; and
(iii) a copolymer of
  (1) up to about 40 weight percent of a $C_{3-6}$ alkenyl nitrile; and
  (2) the balance a $C_{4-6}$ conjugated diolefin; and
(c) up to about 1 percent by weight of a modified starch consisting of not more than 20 weight percent of amylose and the balance amylopectin.

DETAILED DESCRIPTION OF THE INVENTION

As used in this specification, the term Saybolt viscosity means the Saybolt Furol Viscosity in accordance with the American Society for Testing and Materials D88 at 122° F. For rapid setting cationic asphalt emulsions (CRS-2) should have a viscosity from 100 to 400 Saybolt seconds (ASTM-D2397-79). For highway construction rapid setting anionic asphalt emulsions (RS-2)

should have a viscosity of 75 to 400 Saybolt seconds (ASTM-D977). The asphalt emulsions should meet the RS-2 and CRS-2 asphalt emulsion specifications.

The emulsions of the present invention may be held at temperatures from about 120° F. to about 180° F. for times from about 2 to about 24 hours without a significant drop in viscosity.

The starches useful in accordance with the present invention are waxy starches. Waxy starch is discussed in Starch Chemistry and Technology, Vol. I and II, edited by R. L. Whistler and E. F. Paschall, Academic Press, New York, 1965. Waxy starches contain not more than 27 percent cent amylose and the balance amylopectin. Preferably, the waxy starch contains less than 5 percent amylose and most preferably less than 1 percent amylose. Starches used in the present invention are modified. Preferably, the starches are cross-linked. The preparation of cross-linked starch is achieved by reacting starch with a molecule capable of reacting with two or more hydroxyl groups. Suitable cross-linking agents include formaldehyde, phosphorus oxychloride, epichlorohydrin, trimetaphosphate, aldehydes, dialdehydes, vinyl sulfone, diepoxides, 1,3,5-trichloro- and 1,3,5-triacryl-S-triazine, hexamethylene, diisocyanate, bis(hydroxymethyl) ethyleneurea, and N,N' methylene-bisacrylamide. Such modified or cross-linked starches are commercially available. All unmodified starches break down to glucose below pH of 5 or above 7. Modification of starches may make the starch more resistant to degradation to glucose at pH's up to about 10. One particularly useful product is sold by the A. E. Staley Manufacturing Company under the Tradename "Resista". The present invention does not nor is it intended to extend to the processes for manufacturing such starch.

The asphalt emulsion of the present invention may have a pH up to about 10. Preferably, the pH is from about 1.5 to about 10, most preferably from about 4 to 8.

The asphalt emulsion of the present invention is modified with up to 1 percent by weight, based on the dry weight of asphalt, of a waxy starch. Preferably, the waxy starch is present in an amount from about 0.05 to 0.5 percent by weight based on the dry weight of the asphalt. Most preferably the starch is present in an amount from about 0.1 to 0.4; preferably about 0.25 percent by weight based on the dry weight of asphalt.

Preferably, the starch is added to the asphalt emulsion as a slurry containing up to about 50 percent of starch and the balance a compatible emulsifier system for the asphalt emulsion. Compatible means compatible in terms of emulsifier change and pH. The most convenient slurry is about a 20 percent starch, 80 percent aqueous emulsifier system for the asphalt emulsion. However, in many instances water may be used to form the starch slurry. In some instances, the starch may be added to the asphalt emulsion in dry form provided steps are taken to minimize coagulation such as by controlling the rate of addition. This procedure is not advised for rapid set emulsions. Before mixing on a commercial scale, lab quantities of the asphalt emulsion and starch slurry should be mixed to see if there are any problems with the formation of coagulum.

The asphalt emulsion may further comprise a latex of a synthetic polymer. The latex generally should contain from about 35 to about 75 percent by weight of polymeric particles and have a pH of less than about 10. The polymer in the latex is preferably a rubbery polymer. It may be a homopolymer of a $C_{4-6}$ conjugated diolefin; or
a copolymer of
(i) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
(ii) from about 60 to 80 weight percent of a $C_{4-6}$ conjugated diolefin; and
(iii) from 0 up to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; or
a copolymer of
(i) up to about 40 weight percent of a $C_{3-6}$ alkenyl nitrile; and
(ii) the balance a $C_{4-6}$ conjugated diolefin.

Preferred $C_{4-6}$ conjugated diolefins are butadiene and isoprene.

Suitable $C_{8-12}$ vinyl or vinylidene monoaromatic monomers include styrene, $\alpha$-methyl styrene, p-methyl styrene, chlorostyrene, and bromostyrene. Preferably, the vinyl or vinylidene monoaromatic monomers are styrene, $\alpha$-methyl styrene and p-methyl styrene.

Suitable carboxylic acid monomers include ethylenically unsaturated carboxylic acids such as acrylic acid, methacrylic acid, fumaric acid and itaconic acid and their lower alkyl and alkanol esters thereof and primary amides which may be unsubstituted or substituted at the N atom by $C_{1-4}$ alkyl or alkanol radicals. Such monomers include methyl acrylate, ethyl acrylate, hydroxy ethyl acrylate, methy methacrylate, ethyl methacrylate, hydroxethyl methacrylate, acrylamide, methacrylamide, and N-methylol acrylamide.

A preferred alkenyl nitrile is acrylonitrile.

Preferably, the latices are latices of natural rubber, styrene-butadiene copolymers, and acrylonitrile-butadiene copolymers. In the styrene-butadiene copolymers, the styrene level is preferably from about 20 to 35 weight percent and the balance butadiene. The styrene butadiene latices usually contain at least about 60 percent preferably at least about 65 percent solids. The preferred level of acrylonitrile in the ACN-butadiene polymer is about 28 to 34 weight percent and the solids level in the latex is from about 35 to 50 weight percent.

The polymeric latex may be added to the asphalt emulsion in an amount up to about 10 percent by dry weight of latex (i.e. polymer) based on the dry weight of asphalt. The latex should have a charge compatible with the charge in the asphalt in the aqueous emulsion. Thus, an anionic latex should be mixed with an anionic asphalt emulsion, and a cationic latex should be mixed with a cationic asphalt emulsion. Preferably, the latex is used in an amount to provide from about 2 to 5, most preferably about 3 percent by weight of polymer based on the weight of asphalt in the emulsion. The styrene-butadiene latex is preferably cold polymerized and may be anionic or cationic. The acrylonitrile-butadiene latex is preferably anionic. As noted above, the modified waxy starches used in accordance with the present invention tend to degrade at a pH of greater than about 10. Anionic latices are usually stabilized with natural soap such as soaps of tall oils, rosin acid, or fatty acid or long chain vegetable oils. These soaps are pH sensitive and are less effective at pH's less than about 9 or 10. It will be necessary to stabilize anionic latices with a synthetic soap which is effective at pH's less than 10. This will result in a more expensive asphalt emulsion and latex.

Prior to mixing the asphalt and the latex in bulk a small quantity of latex and asphalt should be mixed to determine if the asphalt is likely to be destabilized.

If the asphalt is to be modified with a latex, it is convenient to preblend the latex and starch. The starch is added to the latex in an amount up to 15 dry weight percent based on the dry weight of the latex preferably from about 1 percent by dry weight up. For cationic latices, the starch is preferably added in an amount from about 5 to about 15 weight percent (dry on dry). For anionic latices, the starch is added in amounts from about 1 to about 15 weight percent (dry on dry).

The following examples are intended to illustrate preferred aspects of the present invention. One hundred parts by dry weight of a cold polymerized cationic styrene-butadiene latex containing about 25 percent styrene had added to it various amounts of starch in the form of slurry. The pH of the latex was then adjusted to the specified level. The latex/starch mixture was added to a cationic asphalt emulsion in an amount of 3 percent by dry weight latex/starch based on the dry weight of the asphalt. The modified asphalt was maintained at a temperature of 158° F. for the specified time. The Saybolt Viscosity of the asphalt emulsion was then recorded. The results of the test are set forth in Table 1.

TABLE 1

| | Parts Starch | pH of Latex | Hours @ 158F | Saybolt Viscosity @ 122F, Seconds |
|---|---|---|---|---|
| Ergon* CRS-2 (control)-no latex | 0 | | | 105 |
| Latex | 0 | 4.5 | | 34 |
| Avelex* 1030 | 5 | 6.0 | 2 | 39 |
| Avelex 1030 | 5 | 6.0 | 17 | 46 |
| Avelex 1030 | 10 | 6.0 | 2 | 73 |
| Avelex 1030 | 10 | 6.0 | 16 | 48 |
| Avelex 1030 | 10 | 5.0 | 2 | 81 |
| Avelex 1030 | 10 | 5.0 | 16 | 53 |
| Avelex 1030 | 10 | 3.1 | 2 | 69 |
| Avelex 1030 | 10 | 3.1 | 16 | 49 |
| Avelex 1030 | 10 | 1.9 | 2 | 63 |
| Avelex 1030 | 10 | 1.9 | 16 | 47 |
| Sta-lock* | 10 | 5.0 | 2 | 211 |
| Sta-lock | 10 | 5.0 | 24 | 43 |
| Ethylex* | 10 | 5.0 | 2 | 91 |
| Ethylex | 10 | 5.0 | 24 | 47 |
| Resista* | 10 | 5.0 | 2 | 81 |
| Resista | 10 | 5.0 | 24 | 113 |

Ergon is a tradename for a cationic asphalt emulsion. The starches tested were as follows:
Avelex 1030—modified potato starch (Tradename of American Key Products);
Sta-lock—modified potato starch (Tradename of A. E. Staley Mfg. Co.);
Ethylex—modified corn starch (Tradename of A. E. Staley Mfg. Co.);
Resista—modified waxy corn starch (Tradename of A. E. Staley Mfg. Co.).
From the data:
(1) latex without starch depresses the viscosity of the asphalt emulsion;
(2) generally, modified starches build the viscosity of the emulsion initially, but the viscosity of the asphalt emulsion falls on storage at 158° F. for more than 2 hours;
(3) the viscosity of an asphalt emulsion modified with latex and modified waxy corn starch increases when the emulsion is held at 158° F.

EXAMPLE 2

About 10 parts by dry weight of a modified waxy corn starch were added to the same latex used in the above example per 100 parts by dry weight of latex. The resulting composition was added to a cationic asphalt emulsion and the Saybolt viscosity at 122° F. was measured initially and after 4 hours. The modified cationic emulsion was kept at about 180° F. during the test. The results are set forth below:

| Asphalt emulsion | CRS-2 viscosity = | | 244 Saybolt seconds |
|---|---|---|---|
| Asphalt emulsion + 3% latex/ starch mixture | CRS-2 viscosity | initial = | 195 Saybolt seconds |
| | | 4 hours at about 180° F. | 206 Saybolt seconds |
| Asphalt emulsion + 5% latex/ starch mixture | CRS-2 viscosity | initial = | 146 Saybolt seconds |
| | | 4 hours at about 180° F. | 182 Saybolt seconds |
| Asphalt emulsion + 10% latex/ starch emulsion | CRS-2 viscosity | initial = | 46 Saybolt seconds |
| | | 4 hours at about 180° F. | 153 Saybolt seconds |

What is claimed is:
1. A method of adjusting the viscosity of an asphalt emulsion having a pH up to about 10 to at least about 75 Saybolt seconds at 122° F. which comprises adding to said emulsion from about 0.05 to 1 percent by weight of a cross-linked starch consisting of not more than about 27 percent amylose and the balance substantially amylopectin.
2. A method according to claim 1 wherein said aqueous asphalt emulsion further comprises up to about 10 percent by dry weight based on the dry weight of asphalt, of a latex selected from the group consisting of:
(a) a homopolymer of a $C_4$-$C_6$ conjugated diolefin;
(b) a copolymer of
(i) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
(ii) from about 60 to about 80 weight percent of a $C_{4-6}$ conjugated diolefin;
(iii) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; and
(c) a copolymer of
(i) up to about 40 weight percent of a $C_{3-6}$ alkenyl nitrile; and
(ii) the balance a $C_{4-6}$ conjugated diolefin.
3. A method according to claim 1 wherein the amylose content of the starch is less than about 5 percent.
4. A method according to claim 2, wherein the amylose content of the starch is less than about 1 percent.
5. A method according to claim 1 wherein said aqueous asphalt emulsion further comprises up to about 10 percent by dry weight based on the dry weight of asphalt, of a latex selected from the group consisting of:
   (a) a homopolymer of a $C_4$-$C_6$ conjugated diolefin;
   (b) a copolymer of
      (i) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
      (ii) from about 60 to about 80 weight percent of a $C_{4-6}$ conjugated diolefin;
      (iii) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals.

6. A method according to claim 5 wherein said cross-linked starch is a cross-linked waxy starch selected from the group consisting of waxy maize starch, waxy sorghum starch, waxy rice starch and a mixture thereof.

7. A method according to claim 6 wherein said starch is added to said aqueous asphalt emulsion as a slurry comprising from about 50 to 20 weight percent starch and the balance soap solution used in emulsification of the asphalt emulsion.

8. A method according to claim 6 wherein starch is added to the asphalt as a starch-latex blend comprising up to about 15 dry weight percent of starch based on the dry content of the latex.

9. A method according to claim 5 wherein said aqueous asphalt emulsion is an cationic rapid set emulsion and said latex is cationic and present in an amount from about 8 to 12 percent by dry weight based on the dry weight of asphalt and is a cationic latex of a polymer containing from about 20 to 35 percent bound styrene and from 80 to 65 percent butadiene.

10. A method according to claim 4 wherein said aqueous asphalt emulsion is an anionic rapid set emulsion and said latex is present in an amount up to 5 percent by dry weight based on the dry weight of asphalt and is a anionic latex of a polymer containing from about 28 to 34 percent bound acrylonitrile and from 80 to 75 percent butadiene.

11. A method according to claim 9 wherein said emulsion has a pH from about 1.5 to 10.

12. A composition comprising a latex having a pH up to about 10 and selected from the group consisting of:
   (a) a homopolymer of a $C_4$-$C_6$ conjugated diolefin;
   (b) a copolymer of
      (i) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
      (ii) from about 60 to about 80 weight percent of a $C_{4-6}$ conjugated diolefin;
      (iii) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; and
   (c) a copolymer of
      (i) up to about 40 weight percent of a $C_{3-6}$ alkenyl nitrile; and
      (ii) the balance a $C_{4-6}$ conjugated diolefin;
and 1 to 15 percent by dry weight based on the dry weight of the latex of a cross-linked starch consisting of not more than 27 percent amylose and the balance substantially amylopectin.

13. A composition according to claim 12 wherein said latex is a cationic latex of a copolymer of from about 20 to 35 weight percent of styrene and from about 80 to 65 weight percent butadiene and said starch is present in an amount from about 8 to 12 percent by dry weight based on the dry weight of the latex and is a cross-linked waxy corn starch.

14. A composition according to claim 12 wherein said latex is an anionic latex of a copolymer of from about 20 to 25 weight percent of acrylonitrile and from about 80 to 75 weight percent butadiene and said starch is present in an amount up to 15 percent by dry weight based on the dry weight of the latex and is a cross-linked waxy corn starch.

15. A modified aqueous asphalt emulsion having a pH up to about 10 comprising:
   (a) from about 84 to about 99.9 parts by dry weight of an aqueous bitumen emulsion;
   (b) up to about 15 percent by dry weight, based on the dry weight of the aqueous bitumen emulsion of a latex selected from the group consisting of:
      (i) a homopolymer of a $C_4$-$C_6$ conjugated diolefin;
      (ii) a copolymer of:
         (1) from about 40 to 20 weight percent of a $C_{8-12}$ vinyl or vinylidene aromatic monomer which may be unsubstituted or substituted by a straight or branched chain $C_{1-4}$ alkyl radical or a chlorine or bromine atom;
         (2) from about 60 to about 80 weight percent of a $C_{4-6}$ conjugated diolefin;
         (3) from 0 to about 10 weight percent of a $C_{3-9}$ ethylenically unsaturated carboxylic acid or a $C_{1-4}$ alkyl or alkanol ester thereof or an amide derivative thereof which may be unsubstituted or substituted at the N atom by up to 2 $C_{1-4}$ alkyl or alkanol radicals; and
      (iii) a copolymer of
         (1) up to about 40 weight percent of a $C_{3-6}$ alkenyl nitrile; and
         (2) the balance a $C_{4-6}$ conjugated diolefin; and
   (c) from about 0.05 to 1 percent by dry weight based on the dry weight of said aqueous bitumen emulsion of a cross-linked starch consisting of not more than 27 weight percent of amylose and the balance amylopectin.

16. A composition according to claim 15 wherein said cross-linked starch is selected from the group consisting of waxy maize starch, waxy sorghum starch, waxy rice starch and a mixture thereof.

17. A composition according to claim 15 wherein said latex is present in an amount from about 8 to 12 percent by dry weight and is a cationic latex of a polymer consisting of 20 to 35 weight percent styrene and the balance butadiene.

18. A composition according to claim 15 wherein said latex is present in an amount from about 8 to 12 percent by dry weight and is an anionic latex of a polymer consisting of 20 to 25 weight percent acrylonitrile and the balance butadiene.

19. A composition according to claim 17 which has a pH from about 1.5 to 10.

* * * * *

UNITED STATES PATENT AND TRADEMARK OFFICE
CERTIFICATE OF CORRECTION

PATENT NO. : 4,548,966

DATED : October 22, 1985

INVENTOR(S) : Richard B. Moore

It is certified that error appears in the above-identified patent and that said Letters Patent is hereby corrected as shown below:

Column 3, line 51, "change" should read --charge--.

Signed and Sealed this

Sixth Day of May 1986

[SEAL]

Attest:

DONALD J. QUIGG

Attesting Officer

Commissioner of Patents and Trademarks